April 16, 1940.    W. T. LANG    2,196,996
MULTIPLYING DEVICE
Filed Feb. 7, 1939
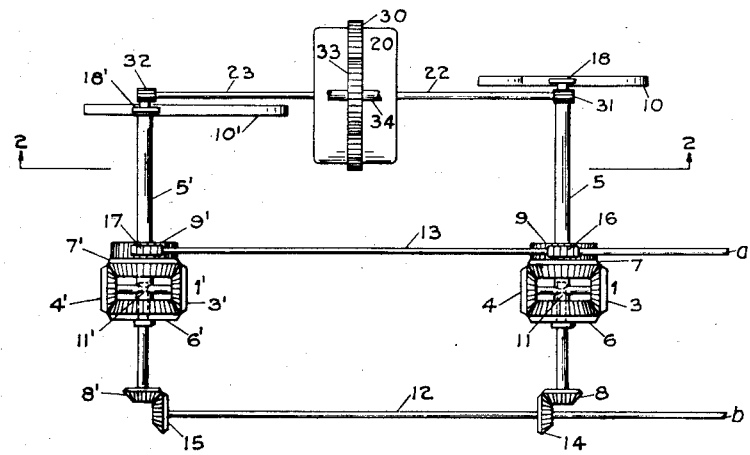
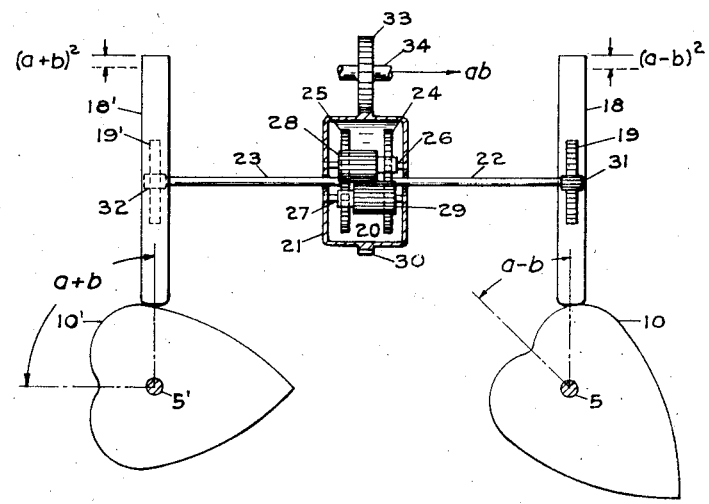
Inventor
Walter T. Lang
By Kessenich & Church
Attorneys Patented Apr. 16, 1940

2,196,996

UNITED STATES PATENT OFFICE 2,196,996

MULTIPLYING DEVICE

Walter T. Lang, Metuchen, N. J.

Application February 7, 1939, Serial No. 255,073

3 Claims. (Cl. 235—61)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a multiplying device of simple and efficient construction, adapted for use in any desired situation where it is required that one quantity be multiplied by another quantity to give a product mechanically.

It is an object of the invention to provide a multiplying device largely comprised of standard parts to facilitate construction and maintenance.

It is a further object of the invention to employ parts, which are not standard, that may be easily constructed.

It is a still further object of the invention to provide an organization of elements, comprising the multiplier, in such functional relation relative to each other that they may be readily shifted relative to each other in a particular design of machine wherein the multiplier is to be employed.

The specific nature of the invention as well as other objects and advantages thereof will clearly appear from a description of a preferred embodiment as shown in the accompanying drawing in which:

Fig. 1 is a diagrammatic plan view of the multiplier;

Fig. 2 is a diagrammatic view in elevation on line 2—2 of Fig. 1.

Referring to the drawing, and more particularly to Fig. 1, it will be seen that three differentials generally indicated at I, I' and 20 and two cams 10 and 10' are used in the multiplier to perform the essential operations.

Differentials I and I' may be of a well known bevel gear type.

The differential I includes the usual planet bevel gears 3 and 4 carried on a spider 11 fixed to the shaft 5 and crown bevel gears 6 and 7 freely rotatably journaled on or relative to shaft 5 in meshing relation with planet gears 3 and 4.

The crown bevel gear or wheel 6 has integral therewith, or otherwise suitably attached thereto, a driving bevel or other gear 8. Likewise crown bevel gear or wheel 7 has worm wheel or other gear 9 suitably secured thereon. The shaft 5 on which spider 11 is fixed extends away from crown wheel 7 any suitable distance and is secured to a cam 10 which will hereinafter be referred to in more detail.

Differential I' may be of the same type as differential I and identical in construction therewith; consequently, a detailed description of differential I' is not believed to be desirable. The elements of differential I' corresponding to the described elements of differential I are identified by the same reference characters primed.

For the purpose of imparting the desired angular displacement to the crown wheels of differentials I and I' two shafts 12 and 13 with suitable gearing may be used.

Shaft 12 is mounted in any well known manner for rotation and has bevel or other suitable gears 14 and 15 fixed thereon which cooperate with the bevel gears 8 and 8', respectively. The gears 14 and 15 are of such size and so arranged on shaft 12 in meshing relation with gears 8 and 8', respectively, as to impart equal and opposite angular displacements to the bevel gears 8, 8' and crown wheels of the differentials attached to the latter upon rotation of shaft 12.

The shaft 13 is also mounted for rotation and has fixedly secured thereto worms or other suitable gearing 16, 17 which cooperate, respectively, with the worm wheels or gears 9 and 9' for rotating the same upon rotation of shaft 13. The ratios between both worms and worm wheels are the same so that rotation of shaft 13 will effect equal angular displacement of crown wheels 7 and 7' and the pitch of the worm gearing is such that shaft 13 may be reversibly rotated and that rotation of both the worm wheels will be in the same direction as that of the shaft.

From the description thus far it will be apparent that shaft 13 may be rotated through an angle proportional to a given quantity which will in turn rotate the crown wheels 7 and 7' in the same direction through a corresponding angular value. Likewise, shaft 12 may be rotated through an angle proportional to a given quantity but in this case due to the disposition of the gearing on shaft 12 the crown wheels 6 and 6' will be rotated in opposed directions equal amounts corresponding to the quantity through which shaft 12 was rotated. The differentials will, therefore, in one case add the quantities transmitted to the crown wheels and in the other case subtract the quantity transmitted to one crown wheel from the quantity transmitted to the other crown wheel.

In the particular embodiment of the invention disclosed, differential I' adds the quantities impressed upon its crown wheels upon clockwise rotation of shafts 12 and 13 and transmits the result through planet wheels 3' and 4' and spider 11' to shaft 5' which is angularly displaced an amount equal to, or proportional to, the sum of the quantities. The differential I functions to transmit the difference between the quantities transmitted thereto by means of its planet wheels 3, and 4 and spider 11 to shaft 5 which is angularly displaced an amount equal to or proportional to this difference. It is obvious, however, that the function of the differentials may be interchanged to suit conditions by reversing the rotation of shaft 12 or 13 or reversing the relation of gears 14 and 15 or relatively reversing gears 7 and 7' with respect to each other.

Cams 10 and 10', attached for rotation to the output shafts 5 and 5' of differentials 1 and 1', respectively, are substantially identical in construction; accordingly, the description of cam 10 may be regarded as the description of cam 10' also. Cam 10 is a simple two-dimensional planar cam having a symmetrical peripheral cam surface so shaped that its lift or throw is proportional to the square of the angle through which the cam is rotated when it is rotated about its axis in either one of opposite directions from a normal zero position. A cam of this type is well adapted to the use in hand as it is symmetrical and offers no obstacle to the employment of standard machine practice in fabrication.

Followers 18 and 18' are are suitably mounted for reciprocation on lines passing through the centers of rotation of cams 10 and 10', respectively, and engage or follow the surfaces of the cams. Each of the followers is provided with a rack, respectively, indicated at 19 and 19'. As mentioned in the description prior hereto, cam 10' will be rotated angularly by differential 1' an amount proportional to the sum of the two quantities transmitted to the differential and that portion of cam surface beneath the follower 18' will lift the follower a distance proportional to the square of the sum of these quantities, for the surface of the cam is designed to have a lift proportional to the square of its angular displacement. Similarly, cam 10 will lift follower 18 a distance proportional to the square of the difference of the quantities as differential 1 rotates the cam through an angle proportional to this difference.

An additional differential 20, which may be of the same type as differentials 1 and 1' or a common spur gear type as shown, is interposed between the followers 18 and 18'. This differential may comprise a casing 21, shafts 22 and 23, and spur gears 24 and 25 within the casing fixed to the shafts 22 and 23, respectively. Extending from the side walls of the casing are axles 26 and 27 which carry the pinions 28 and 29, respectively. Pinion 28 meshes with gear 25 and pinion 29 and pinion 29 also meshes with gear 24. Circumferentially disposed about casing 21 is a ring gear 30. Shaft 22 has a gear 31 engaging rack 19 and shaft 23 has gear 32 engaging rack 19'. A gear 33 of proper ratio relative to ring gear 30 meshes with the latter.

Movement of the follower 18' and its rack 19' will rotate gear 32 an angular distance proportional to the square of the sum of the two quantities through which shafts 12 and 13 have been rotated, and movement of rack 18 will cause gear 31 to subtract from the angular movement of casing 21, as effected by gear 32, an amount equal to the square of the difference of the two quantities through which shafts 12 and 13 have been rotated. As a result of the algebraic combination of the quantities by differential 20, the casing 21, and ring gear 30 will be displaced angularly an amount proportional to the algebraic difference of the squares of the sum of the quantities and the difference of the quantities which shafts 12 and 13 have been rotated, which angular displacement of ring gear 30 is directly proportional to the product of the quantities.

Gear 33 may be of such size and suitably connected to a shaft 34 for transmitting the product to any desired point for actuating other mechanism, or the shaft may be provided with an index or properly graduated scale to cooperate with a scale or index respectively, from which the product may be directly read or otherwise discerned.

The shafts 12 and 13 may, through proper connection, be made operable by any mechanism having movements that is desired to multiply. Alternatively, the shafts 12 and/or 13 may be manually rotated in accordance with two quantities to be multiplied, in which case suitable indices, and graduated scales will be used to guide and govern the operator in actuating the shafts.

The operation of the multiplier is believed to be apparent from the above detailed description; however, to follow the operation of the device in multiplying one quantity by another, let it be assumed that it is desired to multiply quantity $a$ by quantity $b$. Shaft 12 will be rotated through an angle corresponding to quantity $b$ and shaft 13 will be rotated through an angle corresponding to quantity $a$. Because of the relation of gears 14 and 15 to differentials 1 and 1' respectively, the differential 1' will add quantity $a$ to quantity $b$ and differential 1 will subtract quantity $b$ from quantity $a$. Shaft 5' will be angularly displaced $(a+b)$ and shaft 5 will be angularly displaced $(a-b)$ to angularly displace the cams connected therewith corresponding amounts. Since the cams are designed to lift the followers a distance proportional to the square of the angles through which the cams have been rotated, the cam 10' will raise follower 18' a distance proportional to $(a+b)^2$ or, in expanded form of the quantity, a distance equal to $$(a^2+2a \cdot b+b^2)$$

The cam 10 will raise follower 18 a distance proportional to $(a-b)^2$ or, in expanded form of the quantity, a distance equal to $(a^2-2ab+b^2)$. Differential 20 algebraically combines the quantities $(a^2+2a \cdot b+b^2)$ and $(a^2-2a \cdot b+b^2)$ to angularly displace ring gear 30 an amount proportional to or equal to $4ab$, or in direct proportion to the product $a \cdot b$. Gear 33 may be of such ratio with respect to gear 30 as to transmit the product $a \cdot b$ directly to shaft 34.

It is to be noted that each of the factors may be either a positive or a negative number, the directions of rotations of shafts 12, 13 and 34 for negative numbers being opposite to that for positive numbers.

In accordance with the provisions of the patent statutes the principle of operation, together with apparatus now considered to represent a preferred embodiment of the invention has been disclosed, but it is to be understood that the apparatus shown is by way of illustration and not of limitation. Any suitable mechanism may be substituted for the differentials, that will combine the quantities being multiplied in the desired manner, or the combinations may be effected manually.

What I claim as new and desire to secure by Letters Patent of the United States, is:

1. In a device for multiplying one factor by another, a pair of shafts displaceable in accordance with said factors respectively, means interconnected with said shafts for proportionally combining the sum and the difference of the displacements thereof and including output means displaceable in accordance with said sum and difference, a pair of cams having symmetrical lifting surfaces secured to said output means for displacement therewith, said lifting surfaces having lifts proportional to the square of their displacement when displaced in either one of opposite directions from a normal zero position and additional output means for algebraically combining the lifts of said cams.

2. In a device for multiplying one factor by another, a pair of shafts displaceable in accordance with said factors respectively, means interconnected with said shafts for combining the sum and the difference of the displacements thereof and including output shafts displaceable in accordance with said sum and difference, a symmetrical cam secured to each of said output shafts for displacement therewith, said cams each being provided with a planar lifting surface disposed in its plane of displacement and having a lift proportional to the square of its displacement and output means for algebraically combining the lifts of said cams.

3. In a device for multiplying one factor by another, a pair of shafts displaceable in accordance with said factors respectively, means interconnected with said shafts for combining the sum and the difference of the displacements thereof and including output shafts rotatable in accordance with said sum and difference, a symmetrical cam secured to each of said output shafts for rotation therewith, said cams each being provided with a peripheral planar lifting surface disposed in its plane of rotation and having a lift proportional to the square of its rotation, followers engaging said cam surfaces for movement thereby and means including an additional output shaft for algebraically combining the lifts of said followers and driving said last named output shaft a fractional proportion thereof.

WALTER T. LANG.